United States Patent [19]

Olson

[11] 4,439,494
[45] Mar. 27, 1984

[54] SILYL-POLYACRYLATES FOR POLYCARBONATE SUBSTRATES

[75] Inventor: Daniel R. Olson, Schenectady, N.Y.

[73] Assignee: General Electric Company, Schenectady, N.Y.

[21] Appl. No.: 353,685

[22] Filed: Mar. 1, 1982

[51] Int. Cl.$^3$ .......................... B32B 9/04; B05D 3/02
[52] U.S. Cl. .............................. 428/412; 427/385.5; 427/387; 427/388.2; 427/393.5; 524/188; 524/189; 524/205; 524/265; 524/336; 524/337; 524/558
[58] Field of Search ............... 524/558, 205, 265, 188, 524/337, 336, 189; 427/393.5, 387, 385.5, 388.1, 388.2; 428/412, 447, 413

[56] References Cited

U.S. PATENT DOCUMENTS 4,027,073 5/1977 Clark .................................. 428/412
4,348,462 9/1982 Chung ................................ 428/412

Primary Examiner—Thurman K. Page
Attorney, Agent, or Firm—William A. Teoli; James C. Davis, Jr.; James Magee, Jr.

[57] ABSTRACT

Heat curable hard coat compositions are provided of aqueous colloidal silica and copolymer of an alkylacrylate and a polyalkoxysilylacrylate or a mixture of an alkylacrylate-acrylic acid copolymer and an epoxyalkoxysilane. The heat curable hardcoat composition can be applied onto various substrates, for example, a polycarbonate substrate, and thereafter heat cured to produce coated articles having adherent and abrasion resistant coatings.

14 Claims, No Drawings

SILYL-POLYACRYLATES FOR POLYCARBONATE SUBSTRATES

CROSS REFERENCE TO RELATED APPLICATIONS

Reference is made to copending application Ser. No. 269,122, filed June 1, 1981, for Daniel R. Olson et al., for UV Curable Hardcoat Compositions, Coated Articles and Method, assigned to the same assignee as the present invention.

BACKGROUND OF THE INVENTION

Prior to the present invention, thermoplastic substrates, for example, polycarbonate articles, were treated with a photocurable acrylic coating composition, as shown in Moore et al., U.S. Pat. No. 4,198,465, assigned to the same assignee as the present invention. Although the use of acrylic resins provide durable mar resistant and chemical resistant coatings, the ability of such cured polyacrylates to serve as a protective coating for a thermoplastic substrate, often did not satisfy the abrasion resistant standards required in many applications.

As shown by Clark, U.S. Pat. No. 4,027,073, an acidic dispersion of colloidal silica in a hydroxylated silsesquioxane can provide heat curable mixtures which result in valuable transparent abrasion resistant coatings on a variety of thermoplastic substrates. It was found, however, that the cure of the hydroxylated silsesquioxane binder resin often requires several hours, or even days to achieve acceptable mar resistant properties. In addition, a major drawback found with abrasion resistant coatings made in accordance with the aforementioned Clark patent is that the silsesquioxane colloidal silica coating does not adhere well to polycarbonate surfaces unless specialized surface treatments, for example primers, are used.

In the aforesaid copending application Ser. No. 269,122, valuable results were obtained by utilizing a UV curable mixture of a polyalkoxysilylacrylate, aqueous colloidal silica and polyfunctional acrylic monomer. The mixture was convertible to an adherent organopolysiloxane hardcoat in several seconds or less during radiation curing.

I have now discovered that highly abrasion resistant coatings for various thermoplastic substrates, for example, polycarbonate, exhibiting good optical quality and weatherability, also can be obtained from heat curable compositions containing colloidal silica and silyl-containing polyacrylate. The silyl-containing polyacrylate can either be, for example, a methylmethacrylate/γ-methacryloxypropyltrimethoxysilane copolymer or a mixture of methylmethacryate/methacrylic acid copolymer and an epoxy silane. The aforementioned heat curable compositions can be applied onto various thermoplastic substrates and thereafter heated to effect the separation of volatiles, followed by curing of the resulting residue to produce a weather resistant coating having good optical quality and abrasion resistance.

STATEMENT OF THE INVENTION

There is provided by the present invention, heat curable hardcoat compositions comprising the product obtained by mixing together the following essential ingredients by weight, (A) 20 to 80% of colloidal silica utilized as an aqueous dispersion having at least 10% by weight of colloidal silica solids,
(B) 80 to 20% of a silyl-containing polyacrylate selected from the class consisting of
  (i) an alkylacrylate-acryloxyalkyl polyalkoxysilane copolymer or
  (ii) a mixture of a carboxy containing polyacrylate and an epoxy silane and,
(C) 1% to 20% of a UV absorber, based on the weight of (A), (B) and (C).

One of the ingredients of the hardcoat compositions of the present invention is colloidal silica. Colloidal silica is generally available as a dispersion of submicron-sized silica ($SiO_2$) particles in an aqueous medium which may contain an organic solvent such as isopropanol. It provides the hardcoat composition with hardness and integrity along with many of the advantages inherent in silicone products such as a wide-ranging resistance to environmental extremes.

Aqueous dispersions of colloidal silica are available from chemical manufacturers such as DuPont and Nalco Chemical Company. Colloidal silica is available in either acidic or basic form. However, for purposes of the present invention it is preferable that the acidic form be utilized and that there is present at least 10% by weight of colloidal silica solids. It has been found that superior hardcoat properties can be achieved with acidic colloidal silica (i.e. dispersions with low sodium content). Alkaline colloidal silica also may be converted to acidic colloidal silica with additions of acids such as HCl or $H_2SO_4$ along with high agitation.

An example of a satisfactory colloidal silica for use in these coating compositions is Nalcoag 1034A, Available from Nalco Chemical Company, Chicago, Ill. Nalcoag 1034A is a high purity, acidic pH aqueous colloidal silica dispersion having a low $Na_2O$ content, a pH of approximately 3.1 and an $SiO_2$ content of approximately 34% by weight. In the examples given below, the weight in grams of parts by weight of the colloidal silica includes its aqueous medium. Thus, for example, 520 grams of Nalcoag 1034A colloidal silica represents, approximately, 177 grams of $SiO_2$ by weight.

The term colloidal silica is intended to represent a wide variety of finely divided $SiO_2$ forms which can be utilized to form the hardcoat compositions of the present invention without the necessity of undue experimentation. Further description can be found in U.S. Pat. No. 4,027,073.

The heat curable hardcoat compositions of the present invention can be made by combining aqueous colloidal silica with the silyl-containing polyacrylate and the UV absorber. The order of mixing the various ingredients is not critical. The silyl-containing polyacrylate can be in the form of a copolymer of an acrylic monomer and an acryloxyalkylalkoxysilane defined below. The silyl-containing polyacrylate also can be a mixture of a carboxy-containing acrylic copolymer and an epoxyalkoxysilane. Temperatures in the range of about 25°–50° C. can be employed to mix the various ingredients.

Preferably, the acryloxyalkylalkoxysilanes which can be copolymerized with acrylic monomer to form the silyl-containing polyacrylate are included within the formula,

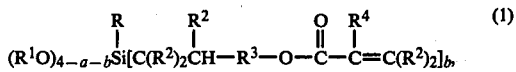
        (1)

where R is a $C_{(1-13)}$ monovalent radical, $R^1$ is a $C_{(1-8)}$ alkyl radical, $R^2$ is selected from hydrogen and R radicals and mixtures thereof, $R^3$ is a divalent $C_{(1-8)}$ alkylene radical, $R^4$ is selected from hydrogen or methyl, a is a whole number equal to 0 to 2 inclusive, b is an integer equal to 1-3 inclusive, and the sum of a+b is equal to 1 to 3 inclusive.

Another form of the silyl-containing polyacrylate used in making the heat curable hardcoat compositions of the present invention is a mixture of a carboxy-containing polyacrylate and an epoxyalkoxy silane of the formula,

        (2)

where $R^5$ is a $C_{(3-12)}$ oxirane containing organic radical, $R^6$ is a $C_{(1-8)}$ alkyl radical and c is an integer equal to 1 or 2.

Radicals which are included by R of formula (1), are for example, $C_{(1-8)}$ alkyl radicals, for example, methyl, ethyl, propyl, butyl, etc.; $C_{(6-13)}$ aryl radicals, for example, phenyl, tolyl, xylyl; aralkyl radicals, for example, benzyl, phenylethyl, etc.; halogenated derivatives thereof. $R^1$ is $C_{(1-8)}$ alkyl radical such as methyl, ethyl, propyl, butyl, etc.; $R^3$ can be methylene, ethylene, trimethylene, etc.; $R^5$ is selected from radicals, such as

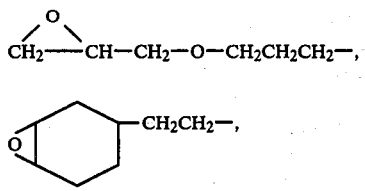

and $R^6$ is selected from $R^1$ radicals.

Some of the acrylic monomers which can be used in the practice of the present invention to form silylpolyacrylates by copolymerization with the silylacrylates of formula (1) are, for example, methyl methacrylate, methyl acrylate, ethyl methacrylate, ethyl acrylate, butyl methacrylate, butyl acrylate, etc. In addition, functionalized acrylic monomers, for example, $CH_2=CH_2CO_2CH_2CH_2OCH_2CH_3$,

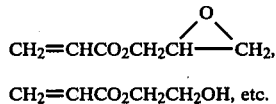

$CH_2=CHCO_2CH_2CH_2OH$, etc.

also can be used in amounts at up to about 50% by weight of the aforementioned acrylic monomer. Copolymerization can be achieved by using 1 to 49 parts of acrylic monomer per part of the silylacrylate of formula (1) at a temperature in the range of from 50° C. to 120° C., preferably at 85° C.±15° C. and in the presence of an effective amount of an organo peroxide or other free-radical initiator, such as azobisisobutyronitrile. There can be used organic solvents such as an aliphatic alcohol, for example, butoxyethanol, methanol, etc., to facilitate the copolymerization which is preferably achieved by agitating the ingredients under an inert atmosphere, for example, nitrogen, for a period of 1 to 48 hours.

The carboxy-containing polyacrylate can be made by copolymerizing an acrylic ester monomer, for example, methyl methacrylate, ethyl methacrylate, butyl methacrylate, methyl acrylate, etc., with an acrylic acid monomer, such as methacrylic acid or acrylic acid.

There can be utilized from about 1 to 50 parts by weight of the acrylic acid monomer, and preferably from about 5 to 30 parts by weight, per 100 parts by weight of the acrylic ester monomer, to form the carboxy-containing polyacrylate which can be formed by agitating a mixture of the aforementioned monomeric acrylic reactants at a temperature of from 50° C. to 120° C., preferably 85° C.±15° C. in an inert atmosphere, for example under nitrogen, in the presence of an organic solvent, such as butoxyethanol.

A typical procedure is to combine 0.5 to 2 milimoles of alkoxysilane per gram of colloidal silica which can be used with the carboxy-containing polyacrylate. Experience has shown that the amount of alkoxysilane used depends on the amount of $SiO_2$ in the formulation.

Included among the polyalkoxysilanes of formula (2) which can be used in the practice of the present invention are compounds having the formulas,

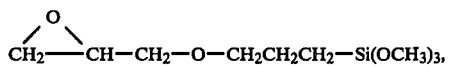

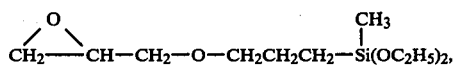

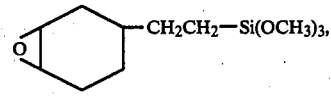

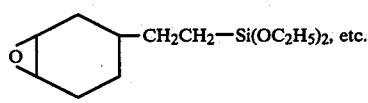

In addition to the aforementioned ingredients of colloidal silica and silyl-containing polyacrylate, an effective amount of a UV absorber can be utilized. Typical UV absorbers are, for example, hydroxybenzophenones, benzotriazoles, cyanoacrylates, benzylidene malonates, salicylates and silane-functional UV absorbers such as

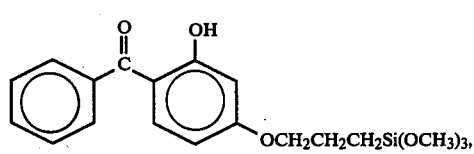

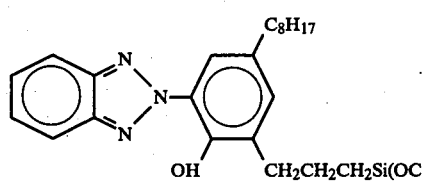

Some of the polyalkoxysilanes which can be used in the practice of the present invention are compounds having the formulas, $CH_2=CCH_3CO_2—CH_2CH_2—Si(OCH_2CH_3)_3$, $CH_2=CHCO_2—CH_2CH_2—Si(OCH_3)_3$, $CH_2=CCH_3CO_2—CH_2CH_2CH_2—Si(OCH_2CH_3)_3$, $CH_2=CHCO_2—CH_2CH_2—Si(OCH_2CH_3)_3$, $CH_2=CCH_3CO_2—CH_2CH_2CH_2—Si(OCH_3)_3$, $CH_2=CHCO_2—CH_2CH_2CH_2—Si(OCH_3)_3$, $CH_2=CCH_3CO_2—CH_2CH_2CH_2—Si(OCH_2CH_3)_3$, $CH_2=CHCO_2—CH_2CH_2CH_2—Si(OCH_2CH_3)_3$, $CH_2=CCH_3CO_2—CH_2CH_2CH_2CH_2—Si(OCH_3)_3$, $CH_2=CHCO_2—CH_2CH_2CH_2CH_2—Si(OCH_2CH_3)_3$, $CH_2=CCH_3CO_2—CH_2CH_2CH_2CH_2—Si(OCH_2CH_3)_3$, $CH_2=CHCO_2—CH_2CH_2CH_2CH_2—Si(OCH_2CH_3)_3$, The coating compositions of the present invention may also optionally contain various flatting agents, surface active agents, thixotropic agents, UV light stabilizers, antioxidants, quenchers, catalysts and dyes.

It has been found that optically clear coatings can be obtained by utilizing a surface active agent in effective amounts, for example, 0.01 to 2 parts of the surface active agent per 100 part of the coating mixture.

Among the surface active agents which can be used are, for example, those shown in Frye U.S. Pat. No. 4,277,287, assigned to the same assignee as the present invention.

The various surface-active agents, including anionic, cationic and nonionic surface-active agents are described in Kirk-Otmer Encyclopedia of Chemical Technology, Vol. 19, Interscience Publishers, New York, 1969, pp. 507–593, and Encyclopedia of Polymer Science and Technology, Vol. 13, Interscience Publishers, New York, 1970, pp. 477–486, both of which are incorporated herein by reference.

Various substrates can be treated in the practice of the present invention with the heat curable hardcoat compositions to produce shaped thermoplastic articles having enhanced abrasion resistance. The heat curable hardcoat compositions can be applied onto the substrate by flow coating, painting, etc. After application, the treated substrate can be heated to a temperature in the range of 85° C. to 140° C. to effect the cure of the hardcoat composition. Substrates which can be treated include Lexan polycarbonate, Valox polyester, Ultem polyetherimide, PPO polyphenyleneoxide, polymethylmethacrylate, metals such as steel, aluminum, metallized thermoplastics, etc. Those skilled in the art also know that certain of the aforementioned substrates can be primed if desired prior to being treated in accordance with the invention, such as priming a polycarbonate substrate with a polyacrylic coating.

In order that those skilled in the art will be better able to practice the invention, the following examples are given by way of illustration and not by way of limitation. All parts are by weight.

EXAMPLE 1

A coating formulation was made by combining at ambient temperatures, 25.92 parts of an 85:15 copolymer of methylmethacrylate and γ-methacryloxypropyltrimethoxysilane (MAPTMS) with 9.54 parts of methanol, 54.04 parts of diacetone alcohol and 43.2 parts of Nalcoag 1034A, which is manufactured by the Nalco Chemical Company, Chicago, Ill. The resulting solids in the formulation contained 60% colloidal silica. In addition, 0.1 part of BYK-300 surfactant manufactured by the Mallinckrodt Chemical Company, was added to the formulation. The above mixture was flow coated onto a Lexan polycarbonate panel, drained 15 minutes and cured for 1 hour at 125° C. An additional mixture was made using 10 parts of the coating formulation to 0.1 part of Uvinul N-539, a UV absorber manufactured by the General Aniline and Film Corporation.

The above coated substrates were evaluated for abrasion resistance using a Taber Abraser and the following results were obtained:

| Coating | % Haze | Initial Abrasion Resistance[a] | | |
|---|---|---|---|---|
| | | $(\Delta\%H)^{50}$ | $(\Delta\%H)^{100}$ | $(\Delta\%H)^{300}$ |
| 40% 85 MMA/15 MAPTMS copolymer + 60 SiO$_2$ colloidal SiO$_2$ | 0.4 | 4 | 4 | 6 |
| 40% 85 MMA/15 MAPTMS copolymer + 60 SiO$_2$ colloidal SiO$_2$ + 5% Uvinul ® N539 | 0.4 | 6 | 7 | 9 |
| 40% 85 MMA/15 MAPTMS copolymer + 60 SiO$_2$ colloidal SiO$_2$ + 14% Uvinul N539 | 0.4 | 4 | 4 | 6 |
| | 0.3 | 10 | 11 | 12 |
| MARGARD ™ polycarbonate sheet | 0.4 | — | 1.5 | 5 |

[a]Change in haze after Taber Abraser Testing. The superscripts after the H indicate the number of Taber cycles.

In the above table, abrasion resistance was determined by measuring the change in percent haze ($\Delta\%H$) using a Gardner model UX10 haze meter before and after 300 cycles of abrasing on a model 174 Taber Abraser equipped with CS10F wheels and 500 gram weights. Margard polycarbonate sheet is manufactured by the General Electric Company and is a commercially available transparent material consisting of a polycarbonate sheet coated with a silicone hardcoat.

The above results show that a hardcoat made in accordance with the practice of the present invention provides satisfactory abrasion resistance to a polycarbonate substrate when compared to a commercially available material, such as Margard polycarbonate sheet.

EXAMPLE 2

A coating formulation was made by combining 0.75 part of glycidoxypropyltrimethoxysilane, 8.58 parts of Nalcoag 1034A and 13.2 parts of a methylmethacrylate/methacrylic acid copolymer. The copolymer was made by combining 200 ml of butoxyethanol, 40 ml of methylmethacrylate, 10 ml of methacrylic acid, 0.1 gram of dodecanethiol and 0.4 gram of azobisisobutyronitrile. The copolymer mixture was stirred at 70°

C.±10° C. in a nitrogen atmosphere for 18 hours. There was then added 10 ml of diacetone alcohol to solublize the copolymer.

The above coating formulation was applied onto a polycarbonate panel and cured for 1 hour. The coated sample had an initial haze of 0.5%. After Taber abrasing for 50, 100 and 300 cycles as shown in Example 1, the change in haze was 4, 6 and 9%, respectively.

It was further found that a polycarbonate panel coated with a lacquer of polymethylmethacrylate having a molecule weight of 37,000, LS-123, of the Bee Chemical Company of Chicago, Ill. exhibited a 20% increase in haze after 50 cycles using the above-described Taber Abraser technique. A 26% increase in haze was experienced by the treated polycarbonate panel after 1000 Taber cycles. An improvement in abrasion resistance was shown with polycarbonate panels treated with a coating mixture of 50% by weight of the polymethylmethacrylate lacquer and 50% of colloidal silica. For Example, after 50 Taber Abraser cycles, a 14% increase in haze was found. This compares favorably with the 20% increase shown for the polymethylmethacrylate lacquer free of colloidal silica. However, as shown by the Table of Example 1, a substantial increase in abrasion resistance was further realized beyond that shown for the mixture of the polymethylmethacrylate lacquer and colloidal silica when the silylacrylate was used in the coating composition either as a silylalkoxy acrylate, or a mixture of a carboxycontaining polyacrylate and alkoxysilane in accordance with the practice of the present invention.

Although the above examples are directed to only a few of the very many variables which can be utilized in the practice of the present invention, it should be understood that the present invention is directed to a much broader variety of coating formulations, coated articles and methods of making such materials as set forth in the description preceding these examples.

What I claim as new and desire to secure by Letters Patent of the United States is:

1. Heat curable hardcoat compositions comprising the product obtained by mixing together the following essential ingredients by weight,
   (A) 20 to 80% of colloidal silica utilized as an aqueous dispersion having at least 10% by weight of colloidal silica solids,
   (B) 80 to 20% of a silyl-containing polyacrylate selected from the class consisting of
      (i) an alkylacrylate-acryloxyalkyl polyalkoxysilane copolymer and
      (ii) a mixture of a carboxy containing polyalkylacrylate and an epoxy silane and
   (C) 1% to 20% of a UV absorber, based on the weight of (A), (B) and (C).

2. A heat curable hardcoat composition in accordance with claim 1, where the silyl-containing acrylate is a methylmethacrylate/γ-methacryloxypropyltrimethoxysilane copolymer.

3. A heat curable hardcoat composition in accordance with claim 1, where the silane containing acrylate is a mixture of methylmethacrylate/methacrylic acid copolymer and glycidoxypropyltrimethoxysilane.

4. A heat curable hardcoat composition in accordance with claim 1, where the UV absorber is

(C$_6$H$_5$)$_2$C=C(CN)CO$_2$C$_8$H$_{17}$.

5. A heat curable hardcoat composition in accordance with claim 1, where the UV absorber is

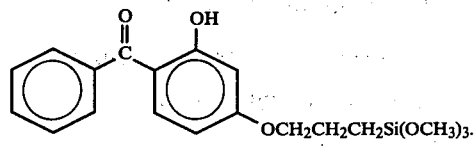

6. A heat curable hardcoat composition in accordance with claim 1, where the UV absorber is

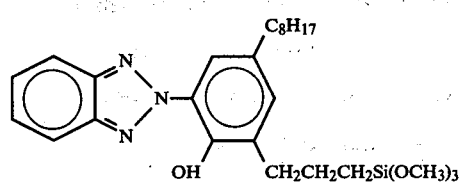

7. A heat curable hardcoat composition in accordance with claim 1, where the UV absorber is

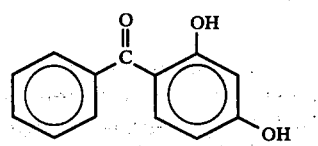

8. A heat curable hardcoat composition in accordance with claim 1, where the UV absorber is

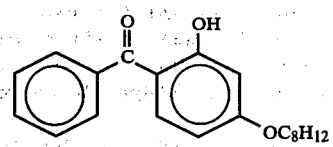

9. A heat curable hardcoat composition in accordance with claim 1, where the UV absorber is

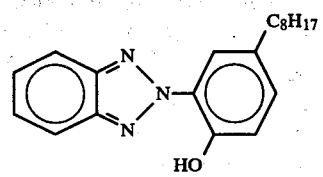

10. A method of improving the abrasion resistance of a thermoplastic substrate which comprises
   (1) treating the surface of the thermoplastic substrate with a heat curable hardcoat composition and
   (2) heating the treated substrate to a temperature in the range of from 85° C. to 140° C., where the heat curable hardcoat composition comprises by weight,
   (A) 20 to 80% of colloidal silica,
   (B) 80 to 20% of a silyl-containing acrylate selected from the class consisting of
      (i) an alkylacrylate-acryloxyalkyl polyalkoxysilane copolymer or
      (ii) a mixture of alkylacrylateacrylic acid copolymer and a glycidoxyalkylpolyalkoxysilane
   (C) 1% to 20% of a UV absorber, based on the weight of (A), (B), and (C).

11. A method of in accordance with claim 10 where the thermoplastic substrate is polycarbonate sheet.

12. A method of in accordance with claim 10 where the silyl-containing acrylate is a methylmethacrylate/γ-methacryloxypropyltrimethoxysilane copolymer.

13. A method of in accordance with claim 10 where the silyl-containing acrylate is a mixture of methylmethacrylate/methacrylic acid copolymer and glycidoxypropyltrimethoxysilane.

14. A polycarbonate substrate treated in accordance with claim 10.

* * * * *